United States Patent
Wolczko et al.

(10) Patent No.: US 7,246,141 B2
(45) Date of Patent: Jul. 17, 2007

(54) METHOD AND APPARATUS FOR SKEWING A BI-DIRECTIONAL OBJECT LAYOUT TO IMPROVE CACHE PERFORMANCE

(75) Inventors: Mario I. Wolczko, San Carlos, CA (US); Matthew L. Seidl, Longmont, CO (US); Gregory M. Wright, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 651 days.

(21) Appl. No.: 10/335,621

(22) Filed: Jan. 2, 2003

(65) Prior Publication Data

US 2004/0133556 A1 Jul. 8, 2004

(51) Int. Cl.
*G06F 12/00* (2006.01)
*G06F 12/02* (2006.01)

(52) U.S. Cl. .................... 707/205; 707/206

(58) Field of Classification Search .............. 707/3, 707/206; 711/209, 133, 206; 712/304, 34; 717/153
See application file for complete search history.

(56) References Cited

U.S. PATENT DOCUMENTS 5,339,438 A * 8/1994 Conner et al. .............. 717/153
5,900,001 A * 5/1999 Wolczko et al. ............ 707/206
6,446,188 B1 * 9/2002 Henderson et al. ......... 711/206
6,842,843 B1 * 1/2005 Vishlitzky et al. .......... 711/209
2004/0123074 A1 * 6/2004 Klein ............................ 712/34
2005/0144391 A1 * 6/2005 Hassane ...................... 711/133

OTHER PUBLICATIONS

Ifor Williams and Mario Woczko, "An Alternative Architecture for Objects: Lessons from the MUSHROOM project", Sep. 12, 1993.*

* cited by examiner

*Primary Examiner*—Don Wong
*Assistant Examiner*—Patrick A. Darno
(74) *Attorney, Agent, or Firm*—Park, Vaughan & Fleming, LLP

(57) ABSTRACT

One embodiment of the present invention facilitates skewing a bi-directional object layout to provide good cache behavior. During operation, the system receives a request to access an object. This request includes an object identifier and an object offset that specifies the offset of a target field within the object, wherein the object has a bi-directional layout that locates scalar fields at positive offsets and reference fields at negative offsets, so that a reference field can be immediately identified from its object offset. Next, the system determines a skew value for a cache line containing the object, wherein data within the cache line is shifted based upon the skew value, so that reference fields with small negative offsets are likely to be located in the same cache line as scalar fields with small positive offsets. Next, the system uses the skew value in accessing the object.

20 Claims, 4 Drawing Sheets

METHOD AND APPARATUS FOR SKEWING A BI-DIRECTIONAL OBJECT LAYOUT TO IMPROVE CACHE PERFORMANCE

BACKGROUND

1. Field of the Invention

The present invention relates to the design of computer systems that support automatic memory management for objects defined within an object-oriented programming system. More specifically, the present invention relates to a method and an apparatus for skewing a bi-directional object layout to provide good cache behavior, wherein the bi-directional object layout allows reference fields within an object to be easily identified for garbage collection purposes.

2. Related Art

Programming languages with automatic memory management, such as the JAVA™ programming language, are widely recognized for making software easier to develop. Unlike conventional programming languages, such as C or C++, that require programmers to perform explicit memory deallocation operations to manage dynamic data structures, the JAVA programming language takes care of memory management automatically.

Automatic memory management systems typically allocate objects from memory as they are needed during execution of a program. When objects are no longer being used by the program, they are typically reclaimed through a process known as "garbage collection."

Garbage collection typically operates by first identifying and marking "live" objects that are reachable from roots of a program. Once all reachable objects are marked, all remaining objects that are not marked are considered "garbage." These remaining objects are subsequently reclaimed to make room in memory.

During the marking process, it is advantageous to be able to rapidly determine which fields within an object are "reference fields" that can potentially point to other reachable objects. One way to accomplish this is to use a bi-directional object layout, which allows a reference field to be identified by examining its offset.

Referring to FIG. 1, a conventional object layout 102 includes a header 106 that is located at offset zero from a base address 104 for the object. Object layout 102 also includes other fields at increasing offsets, including scalar fields 108 and reference fields 110. (Note that scalar fields 108 and reference fields 110 can be intermixed.) Each subclass appends fields in order.

In contrast, a bi-directional object layout 112 uses negative offsets for reference fields. This bi-directional layout 112 grows in both directions from the header 116. Scalar fields are placed at positive offsets and reference fields are placed at negative offsets. This allows a reference field to be identified immediately by examining its offset. This bi-directional object layout scheme is described in more detail in U.S. Pat. No. 5,900,001, entitled "Method and Apparatus for Optimizing Exact Garbage Collection Using a Bifurcated Data Structure," by inventors Mario I. Wolczko and David M. Ungar, issued May 4, 1999.

Although use of a bi-directional layout can greatly improve system performance during garbage collection, it often has the unfortunate side-effect of causing small objects to occupy two cache lines in a cache that is part of an object-based memory hierarchy because of the way offsets are aligned with the base address of a cache line. For example, assuming a 64-byte cache line and 4-byte references, an object header (at offset zero) is the first word in one cache line, and a class reference at, for example, offset −4 is the final word in a preceding cache line starting at offset −64. Splitting small objects across two cache lines in this way leads to unused cache space and unnecessary data transfers.

What is needed is a method and apparatus that facilitates using a bi-directional object layout without the above-described problems.

SUMMARY

One embodiment of the present invention facilitates skewing a bi-directional object layout to provide good cache behavior. During operation, the system receives a request to access an object. This request includes an object identifier and an object offset that specifies the offset of a target field within the object, wherein the object has a bi-directional layout that locates scalar fields at positive offsets and reference fields at negative offsets, so that a reference field can be immediately identified from its object offset. Next, the system determines a skew value for a cache line containing the object, wherein data within the cache line is shifted based upon the skew value, so that reference fields with small negative offsets are likely to be located in the same cache line as scalar fields with small positive offsets. Next, the system uses the skew value in accessing the object.

In a variation on this embodiment, the system determines the skew value for the object during class definition time for the object, wherein the skew value is determined based upon a total amount of space within the object dedicated to reference fields and/or scalar fields.

In a variation on this embodiment, the system encodes the skew value into the object identifier at object creation time. This enables the skew value to be determined by examining the object identifier.

In a variation on this embodiment, using the skew value to access the object involves using the skew value to calculate an object offset used to index the target field within the cache.

In a variation on this embodiment, using the skew value to calculate the object offset involves adding the skew value to higher order bits of the object offset to produce a modified object offset that is used to index the target field within the cache. In this way, data within the cache line is shifted based upon the skew value.

In a variation on this embodiment, processing the request to access the object involves forming an index for the cache line from lower order bits of the object identifier and higher order bits of the modified object offset. The system uses this index to retrieve the cache line from a cache if the cache line is located within the cache. Next, the system uses the modified object offset to access the target field within the cache line.

In a variation on this embodiment, the request to access the object can include a read request or a write request.

In a variation on this embodiment, the object is defined within an object-oriented programming system.

The present invention allows offset zero for an object to occur in the middle of a cache line, with reference fields and scalar fields arranged on either side of it. In this way, a small object can be contained within a single cache line. (The position of offset zero within the cache line is referred to as the "skew," and the skew is constant for any particular object.)

Note that skewing allows any object (small or large) to be accommodated in the minimum possible number of cache lines; without skewing, some objects would require one extra cache line. The worst case is for a small object, which would normally occupy two cache lines, but with skewing would occupy only one cache line.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer System

Figure 1:
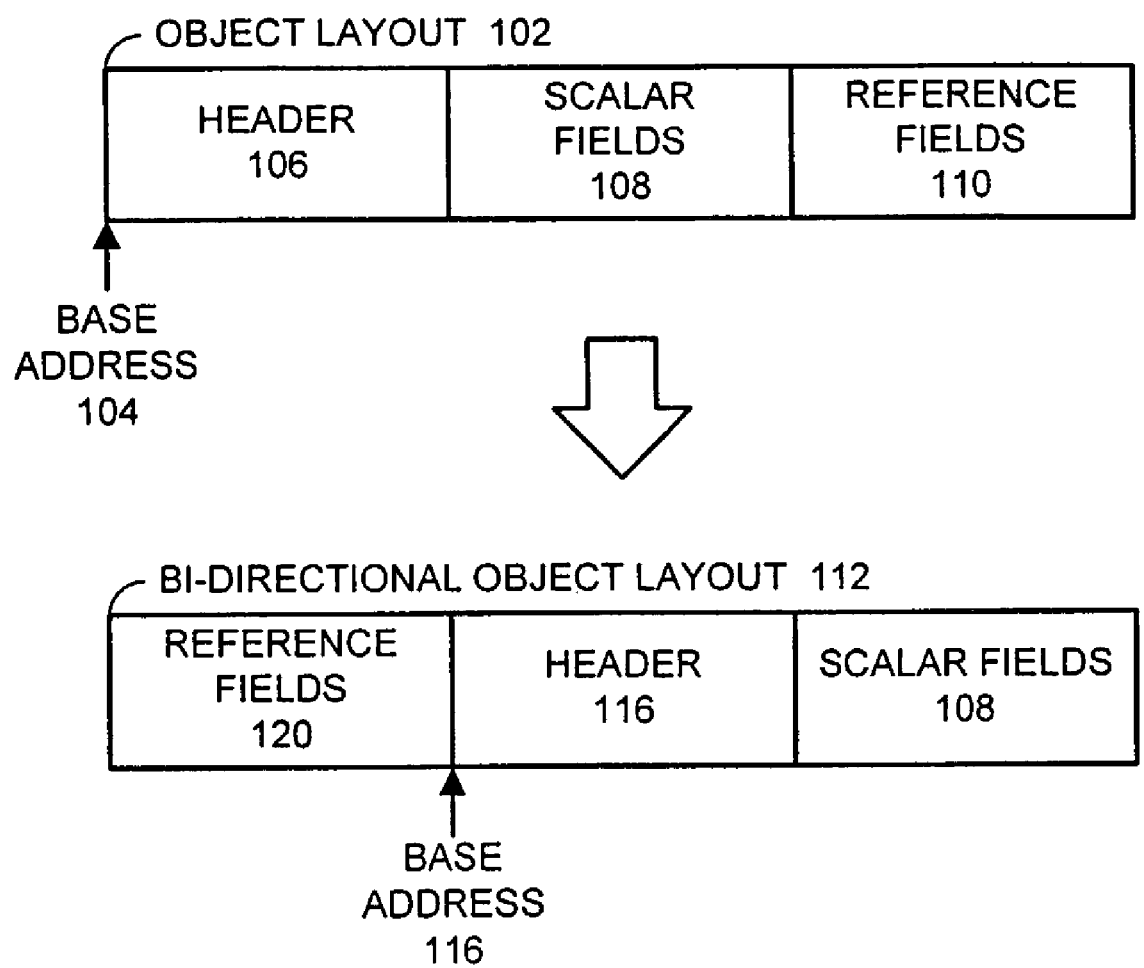
FIG. 1 illustrates a conventional object layout and a bi-directional object layout in accordance with an embodiment of the present invention.
Figure 2:
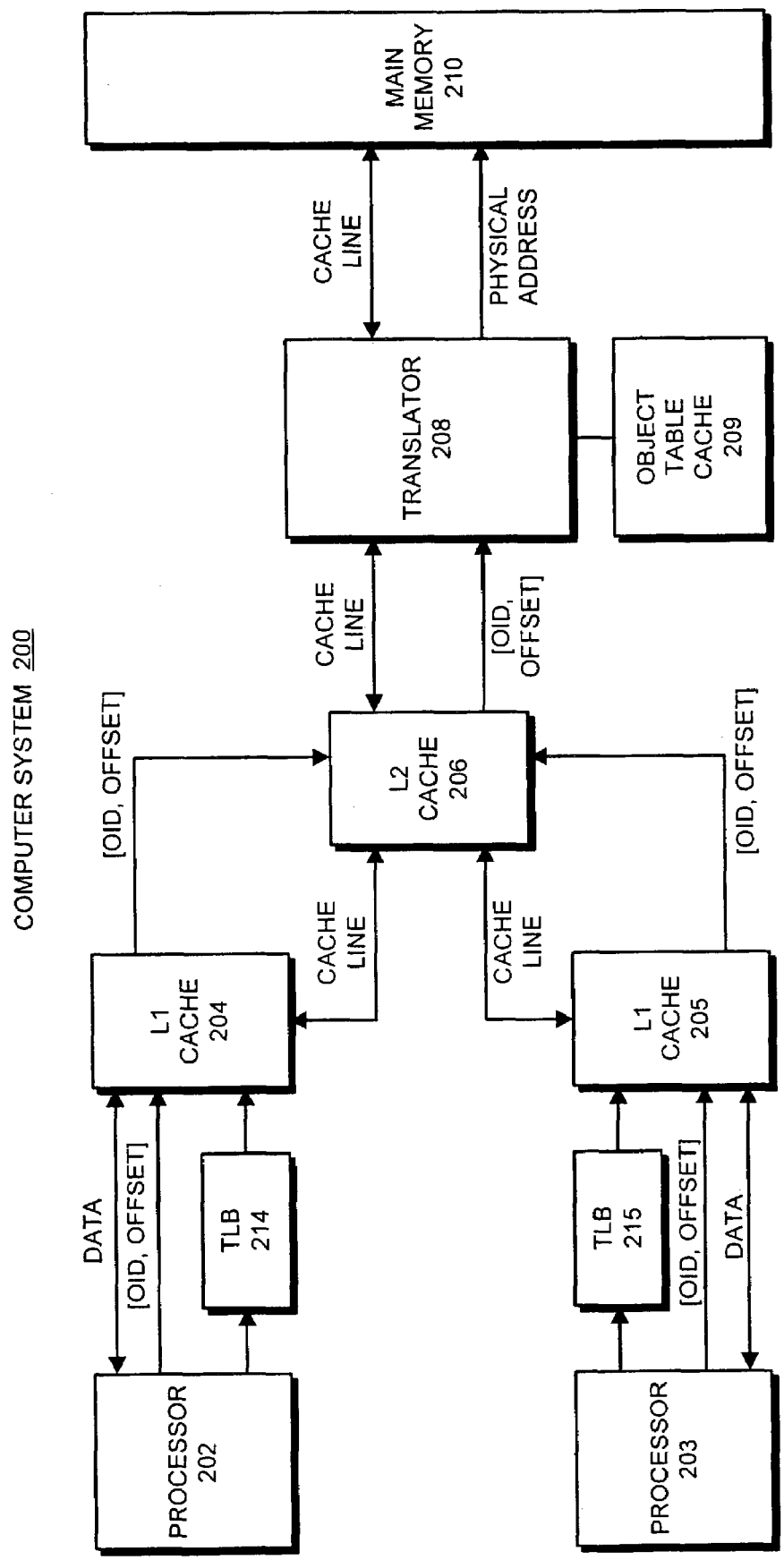
FIG. 2 illustrates a computer system in accordance with an embodiment of the present invention.

FIG. 2 illustrates a computer system 200 in accordance with an embodiment of the present invention. Computer system 200 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 2, computer system 200 includes processors 202 and 203. Processors 202 and 203 access code and data from L1 caches 204 and 205, respectively. Note that L1 caches 204 and 205 can include unified instruction/data caches, or alternatively, separate instruction caches and data caches.

Processors 202 and 203 are associated with translation look aside buffers (TLBs) 214 and 215, which facilitate translating virtual addresses into physical addresses for non-object references.

L1 cache 204 and L1 cache 205 make use of an extended address encoding procedure that enables L1 cache 204 to function as both a conventional cache and an object cache. For example, during a conventional load operation, a virtual address is sent from processor 202 to TLB 214. TLB 214 translates the virtual address into a physical address, which is subsequently used by L1 cache 204.

In contrast, during a load operation involving a portion of an object, processor 202 obtains the corresponding object ID (OID) and offset and combines them to create an object address. This object address is embedded into an unused portion of the physical address space to produce an encoded address. Note that the higher order bits of this encoded address are different than the higher order bits of any physical address. This allows the system to distinguish an encoded address from a physical address. When the encoded address is subsequently sent from processor 202 to L1 cache 204, the encoded address bypasses TLB 214 and directly enters L1 cache 204. Note that only minor modifications are required to conventional cache designs in order to provide object caching using the above-described technique.

In order to request a non-object data item, such as a value from a normal virtual address, processor 202 generates a virtual address that is sent to TLB 214. TLB 214 translates this virtual address into a physical address, which is sent to L1 cache 204.

Note that after an object address is translated into an encoded address L1 cache 204, L1 cache 205 and L2 cache 206 can treat the encoded address in the same manner as a normal physical address.

If a given data item (or instruction) is not located within L1 cache 204 or L1 cache 205, it is retrieved from L2 cache 206. If it is not located within L2 cache 206, it is pulled into L2 cache 206 from main memory 210.

Unlike in a conventional memory hierarchy, a translator 208 is interposed between L2 cache 206 and main memory 210. Translator 208 converts an object address, comprising an object ID and an offset, into a corresponding physical address, which is sent to main memory 210.

If an object is not present within L2 cache 206, the encoded address is forwarded to translator 208. Translator 208 uses an object table to translate the encoded address into a corresponding physical address. Each object table entry associates a given object ID with a corresponding physical address in main memory where the object resides. Note that this object table, which contains translations for all objects, can be located in main memory 210.

When a cache miss for an object occurs in L2 cache 206, translator 208 intercepts the encoded address and extracts the object ID. Translator 208 uses the object-ID to search the object table for a corresponding physical address. Once the physical address is found, translator 208 converts the load request for the object into a load request for a physical address in main memory 210.

The system uses the physical address and the offset to locate a specific cache line (or cache lines) in main memory 210. Fetching circuitry within translator 208 directs the normal load hardware to issue a load instruction to main memory 210. This fetching circuitry subsequently receives the cache line corresponding to the physical address. The fetching circuitry then forwards the cache line to L2 cache 206.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes typically starts at a physical address that is a multiple of 64. Objects, however, may start on any physical address which is a multiple of four in a 32-bit system. Thus, a 64-byte object cache line starting at address 44 includes addresses (44 . . . 107). This overlaps with physical cache lines (0 . . . 63) and (64 . . . 127). In this case, the object is split across two physical cache lines. Hence, two load operations are required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 206, translator 208 converts the encoded address containing the object ID and the offset into a physical address. The fetching circuitry subsequently uses the physical address to generate a store operation to store the evicted cache line in main memory 210.

For performance reasons the fetching circuitry within translator 208 makes use of an object table cache 209, which stores object-table entries that are likely to be used to perform translations. Note that object table cache 209 operates similarly to a TLB, except that instead of storing commonly used virtual-to-physical address translations, object table cache 209 stores commonly used object ID-to-physical address translations.

Note that processors 202 and 203 are configured to handle the extended address encoding procedure described above. In one embodiment of the present invention, a platform-independent virtual machine, such as a JAVA VIRTUAL MACHINE, is modified to generate requests for portions of an object using an object ID and an offset. Moreover, in one embodiment of the present invention, processors 202 and 203 are configured to execute special instructions for performing load and store operations involving an object ID and an offset—in addition to normal load and store instructions that use virtual addresses.

Although the present invention is described with reference to a computer system 200 with two levels of cache, the present invention can generally be used with any single-level or multi-level caching structure. Furthermore, although computer system 200 includes two processors, the present invention can generally be used with any number of processors.

Address Generation Circuitry

Figure 3:
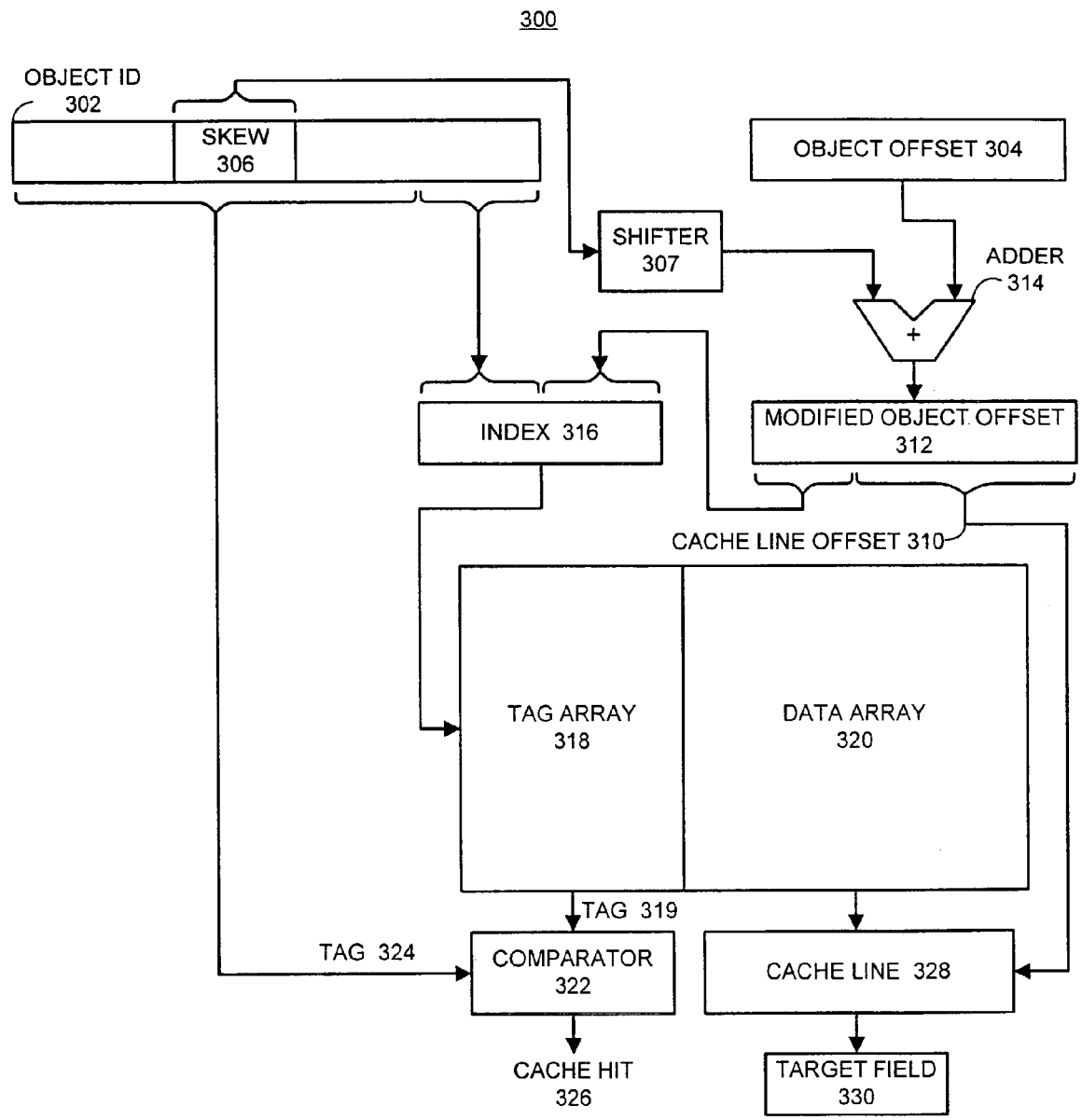
FIG. 3 illustrates address generation circuitry in accordance with an embodiment of the present invention.

FIG. 3 illustrates the structure of address generation circuitry 300 in accordance with an embodiment of the present invention. Address generation circuit 300 processes references to a cache, such as L1 cache 204 in FIG. 2. As is illustrated in FIG. 2, address generation circuitry 300 receives an object identifier 302 that uniquely identifies an object, and an object offset 304 that specifies an offset of a target field within the object.

The circuitry then retrieves a skew value 306 that is encoded in a set of bits within object identifier 302. Skew value 306 is then shifted by appropriately routing the wires carrying skew value 306. Next, the shifted skew value 306 is added to the object offset 304.

Note that adding skew value 306 to object offset 304 effectively shifts the fields within the cache line. In doing so, the skew value 306 indicates the position of offset zero within the shifted cache line. The addition operation produces modified object offset 312, the lower order portion of which is subsequently used to index a target field 330 within cache line 328.

The higher order portion of modified object offset 312 is concatenated with the lower order portion of object identifier 302 to form index 316. Index 316 is used to retrieve a tag 319 from tag array 318. It is also used to retrieve a cache line 328 from data array 320. The higher order bits of object identifier 302 form tag 324, which is compared against tag 319 in comparator 322. This produces cache hit signal 326.

Note that although the present invention is described in the context of a direct-mapped cache, the present invention can also be applied to other types of caches, such as a set-associative cache.

The operation of the circuitry illustrated in FIG. 3 is described in more detail below with reference to FIG. 4.

Process of Accessing a Bi-directional Object with a Skewed Layout

Figure 4:
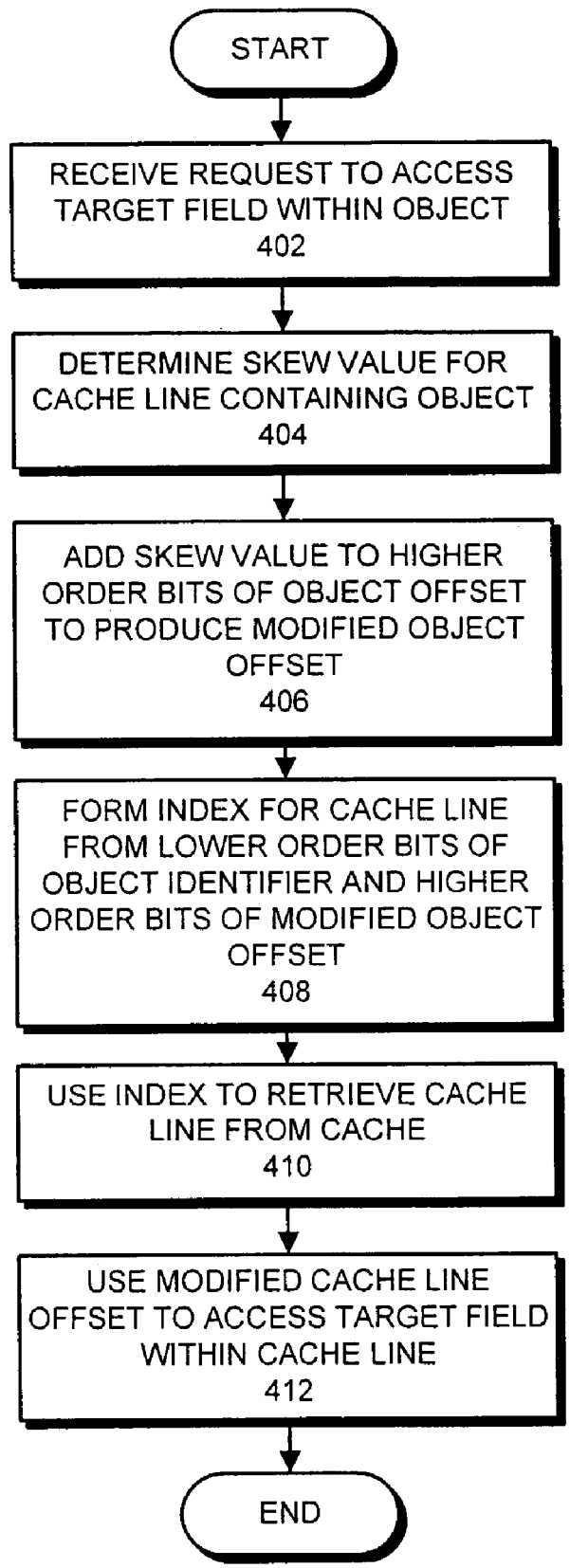
FIG. 4 presents a flow chart illustrating the process of accessing a bi-directional object with a skewed layout in accordance with an embodiment of the present invention.

FIG. 4 presents a flow chart illustrating the process of accessing a bi-directional object with a skewed layout in accordance with an embodiment of the present invention. This process starts when the system receives a request to access a target field within an object (step 402). This request includes an object identifier 302, which uniquely identifies the object, and an object offset 304, which specifies the offset of the target field within the object.

Next, the system determines the skew value for the object (step 404). In one embodiment of the present invention, this involves extracting the skew value from the object identifier 302. The system then adds the skew value 306 (after shifting) to object offset 304 to produce modified object offset 312 (step 406).

The system then forms index 316 by concatenating the higher order bits of modified object offset 312 with the lower order bits of object identifier 302 (step 408). Index 316 is then used to retrieve cache line 328 from the cache (step 410). Note that index 316 is also used to retrieve tag 319 from the cache to determine if the desired cache line is contained within the cache. If so, modified cache line offset 312 is used to index the target field 330 within cache line 328.

The skew value for the object can be determined during class definition time for the object. Note that the skew value can determined by considering both the amount of space in the object dedicated to references and/or the amount of space dedicated to scalars. If the object has R references and S scalars, and a cache line is C words, then the skew will be (R mod C) in order to place the first reference at the beginning of a cache line. To place the last scalar at the end of a cache line it would be (C−S) mod C. Both of these options minimize the number of cache lines used, as do some other values, in some cases.

Note that for any particular combination of reference and non-reference fields in an object, some skew values may result in the object requiring one less cache line than the other values. For example, if cache lines are 8 words long, and valid skews are in the range 0-7, then if we have an object with 5 reference fields and 2 non-reference fields, skews of 5 and 6 will result in the object fitting in one cache line; 0-4 and 7 will cause the object to be split across 2 cache lines. Also note that the object creation function must know about the skew in order to encode the skew into the object identifier.

The present invention is suitable for an "in-cache" garbage collection process that only collects dynamically allocated objects in the cache. This approach increases garbage collection efficiency because there is no garbage collection performed in memory external to the cache.

Moreover, the present invention provides hardware support for a "read barrier" that facilitates incremental and/or concurrent garbage collection without requiring tagged memory.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates skewing a bi-directional object layout to provide good cache behavior, comprising:
   receiving a request to access an object;
   wherein the request includes an object identifier and an object offset that specifies an offset of a target field within the object;
   wherein the object has a bi-directional layout that locates scalar fields at positive offsets and reference fields at negative offsets, so that a reference field can be immediately identified from its object offset;
   determining a skew value for a cache line containing the object, wherein the skew value is determined from a total amount of space within the object dedicated to at least one of reference fields and scalar fields;
   wherein data within the cache line is shifted based upon the skew value,
   wherein shifting based on the skew value allows the object to be accommodated in the minimum possible number of cache lines, so that reference fields with small negative offsets are located in the same cache line as scalar fields with small positive offsets; and
   using the skew value to access the object.

2. The method of claim 1, further comprising determining the skew value for the object during class definition time for the object.

3. The method of claim 1, further comprising encoding the skew value into the object identifier at object creation time.

4. The method of claim 3, wherein determining the skew value involves examining the object identifier.

5. The method of claim 1, wherein using the skew value to access the object involves using the skew value to calculate an object offset used to index the target field within the cache.

6. The method of claim 5, wherein using the skew value to calculate the object offset involves adding the skew value to higher order bits of the object offset to produce a modified object offset that is used to index the target field within the cache;
   whereby data within the cache line is shifted based upon the skew value.

7. The method of claim 6, wherein processing the request to access the object involves:
   forming an index for the cache line from lower order bits of the object identifier and higher order bits of the modified object offset;
   using the index to retrieve the cache line from a cache if the cache line is located within the cache; and
   using the modified object offset to access the target field within the cache line.

8. The method of claim 1, wherein the request to access the object can include a read request or a write request.

9. The method of claim 1, wherein the object is defined within an object-oriented programming system.

10. An apparatus that facilitates skewing a bi-directional object layout to provide good cache behavior, comprising:
    an input that is configured to receive a request to access an object;
    wherein the request includes an object identifier and an object offset that specifies an offset of a target field within the object;
    wherein the object has a bi-directional layout that locates scalar fields at positive offsets and reference fields at negative offsets, so that a reference field can be immediately identified from its object offset;
    a skew value determining mechanism that is configured to determine a skew value for a cache line containing the object, wherein the skew value is determined from a total amount of space within the object dedicated to at least one of reference fields and scalar fields;
    wherein data within the cache line is shifted based upon the skew value,
    wherein shifting based on the skew value allows the object to be accommodated in the minimum possible number of cache lines, so that reference fields with small negative offsets are located in the same cache line as scalar fields with small positive offsets; and
    an access mechanism that is configured to use the skew value to access the object.

11. The apparatus of claim 10, further comprising a skew value initialization mechanism that is configured to determine the skew value for the object during class definition time for the object.

12. The apparatus of claim 10, further comprising a skew value encoding mechanism that is configured to encode the skew value into the object identifier at object creation time.

13. The apparatus of claim 12, wherein the skew value determining mechanism is configured to determine the skew value by examining the object identifier.

14. The apparatus of claim 10, wherein the access mechanism is configured to use the skew value to calculate an object offset used to index the target field within the cache.

15. The apparatus of claim 14, wherein the access mechanism is configured to add the skew value to higher order bits of the object offset to produce a modified object offset that is used to index the target field within the cache;
    whereby data within the cache line is shifted based upon the skew value.

16. The apparatus of claim 15, wherein the access mechanism is configured to:
    form an index for the cache line from lower order bits of the object identifier and higher order bits of the modified object offset;
    use the index to retrieve the cache line from a cache if the cache line is located within the cache; and to
    use the modified object offset to access the target field within the cache line.

17. The apparatus of claim 10, wherein the request to access the object can include a read request or a write request.

18. The apparatus of claim 10, wherein the object is defined within an object-oriented programming system.

19. A computer system that facilitates skewing a bi-directional object layout to provide good cache behavior, comprising:
    a central processing unit;
    a cache memory coupled the central processing unit;
    address generation circuitry within the central processing unit that is configured to receive a request to access an object;
    wherein the request includes an object identifier and an object offset that specifies an offset of a target field within the object;
    wherein the object has a bi-directional layout that locates scalar fields at positive offsets and reference fields at negative offsets, so that a reference field can be immediately identified from its object offset;

wherein the address generation circuitry is configured to determine a skew value for a cache line containing the object, wherein the skew value is determined from a total amount of space within the object dedicated to at least one of reference fields and scalar fields;

wherein data within the cache line is shifted based upon the skew value, wherein shifting based on the skew value allows the object to be accommodated in the minimum possible number of cache lines, so that reference fields with small negative offsets are located in the same cache line as scalar fields with small positive offsets; and wherein the address generation circuitry is configured to use the skew value to access the object.

20. The computer system of claim 19, wherein while processing the request, the central processing unit is configured to:

add the skew value to higher order bits of the object offset to produce a modified object offset that is used to index the target field within the cache;

form an index for the cache line from lower order bits of the object identifier and higher order bits of the modified object offset;

use the index to retrieve the cache line from a cache if the cache line is located within the cache; and to use the modified object offset to access the target field within the cache line.

* * * * *